United States Patent [19]
Léomand

[11] 3,776,139
[45] Dec. 4, 1973

[54] PYROLYTIC CARBON NOSE FOR HYPERSONIC VEHICLES

[75] Inventor: Gerard C. Léomand, Chaville, France

[73] Assignee: Societe Nationale Industrielle Aerospatiale, Paris, France

[22] Filed: June 7, 1972

[21] Appl. No.: 260,363

[30] Foreign Application Priority Data
June 11, 1971 France .............................. 7121386

[52] U.S. Cl. ............................... 102/105, 244/1 SS
[51] Int. Cl. ............................................ F42b 13/00
[58] Field of Search .......................... 102/105, 49.4; 244/1 SS, 117

[56] References Cited
UNITED STATES PATENTS
3,596,604  8/1971  Corkery .............................. 102/105
3,536,011  10/1970  Kinnaird ............................. 102/105
3,428,473  2/1969  Langley ......................... 244/1 SS X
3,152,548  10/1964  Schwartz ............................. 102/105
3,103,885  9/1963  Mclauchlan ................. 244/117 A X
3,095,162  6/1963  Keon ............................... 244/117 A Primary Examiner—Benjamin A. Borchelt
Assistant Examiner—Harold Tudor
Attorney—Karl W. Flocks

[57] ABSTRACT

The present invention provides a spacecraft re-entry nose which makes use of the very marked anisotropy of pyrolytic graphite, which pyrolytic graphite is arranged in slices which are orientated so that the direction of least thermal conductivity is along the main axis of the nose whereas the direction of greatest thermal conductivity is at right angles to the surface of each slice. The slices are interconnected in pairs by three traversing pins of tungsten offset by a certain angle every two slices.

6 Claims, 14 Drawing Figures

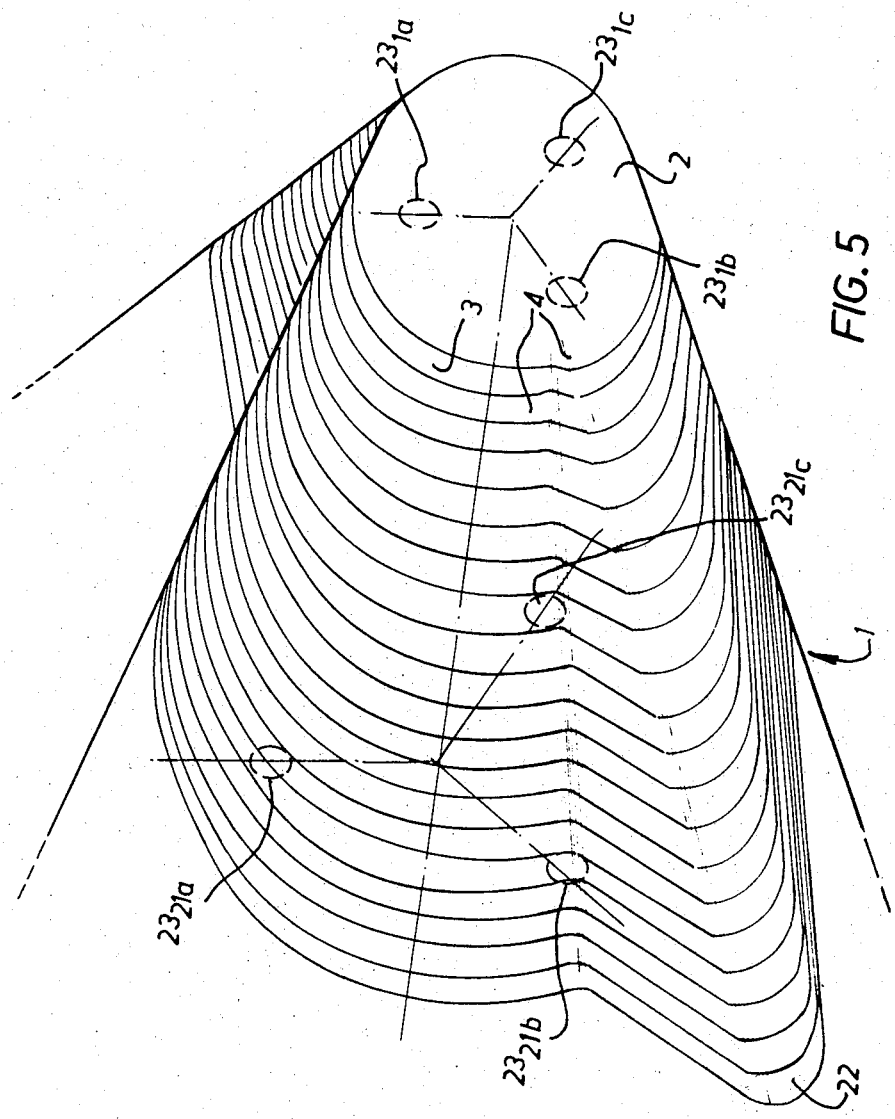

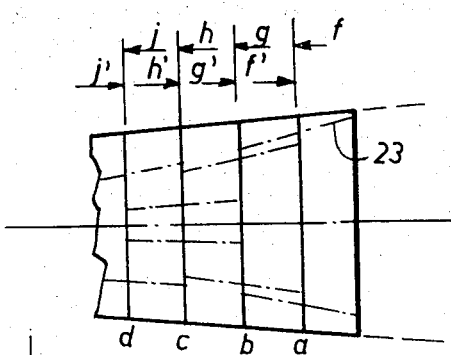

FIG.6

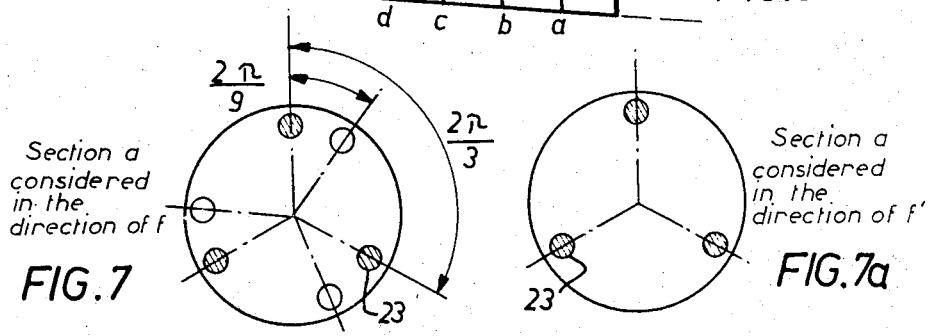

FIG.7 — Section a considered in the direction of f

FIG.7a — Section a considered in the direction of f'

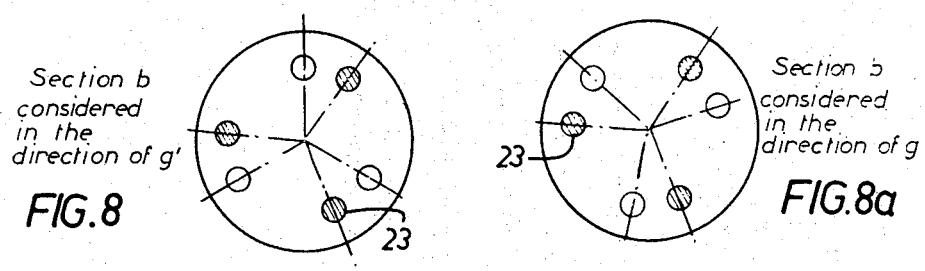

FIG.8 — Section b considered in the direction of g'

FIG.8a — Section b considered in the direction of g

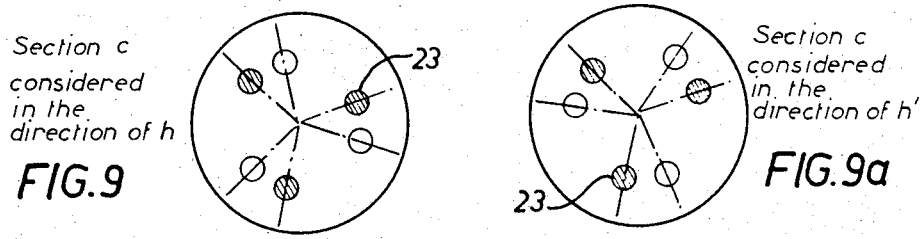

FIG.9 — Section c considered in the direction of h

FIG.9a — Section c considered in the direction of h'

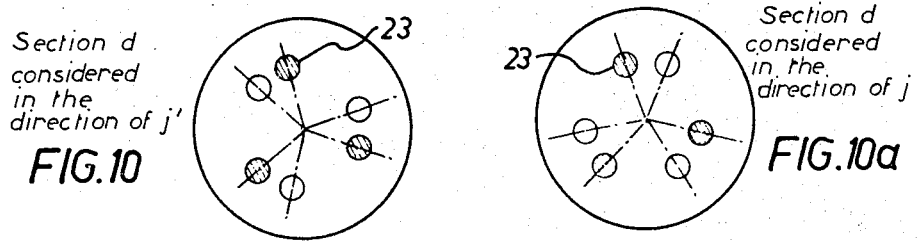

FIG.10 — Section d considered in the direction of j'

FIG.10a — Section d considered in the direction of j

PYROLYTIC CARBON NOSE FOR HYPERSONIC VEHICLES

Hypersonic gliders designed to fly at high Mach numbers in excess of Mach 5 pose difficult cooling problems during re-entry into the dense layers of the atmosphere, and it is well-known for example that certain gliders must be capable of withstanding a strong thermal flux of nearly 100 kW/m² for approximately 500 seconds.

In such a thermal environment the large amount of heat entering the structure, particularly at the stagnation point, which is the nose of the vehicle, must be dissipated, and various methods are used to that end.

Among known methods may be mentioned the use of a so-called "heat sink," which consists in using a massive block of some material having a high melting point and high specific heat, such as Inconel. Another solution based on a refractory material consists in using either a nose made of a complex material covered with ceramic or in providing some convenient armature covered with precracked ceramic and reinforced with platinum wire.

A third solution based on carbon may again consist either in using a solid nose made of amorphous carbon protected from oxidation by a deposit based on molybdenum or in providing a convenient substrate covered with a pyrolytic carbon nose-cone, in which case the direction of least thermal conductivity is at right angles to the surface of the substrate. Such a technique was in fact described in U.S. Pat. No. 3,095,162.

However, the solutions proposed heretofore do not give complete satisfaction in that the heat flux is not properly distributed through the material forming the nose of the vehicle.

The present invention provides a spacecraft re-entry nose which makes use of the very marked anisotropy of pyrolytic graphite, which pyrolytic graphite is arranged in slices which are orientated so that the direction of least thermal conductivity is along the main axis of the nose whereas the direction of greatest thermal conductivity is at right angles to the surface of each slice.

A specific assembly method utilizing interconnecting pins made of a material with a hig melting point furthermore enables the slices to be secured to one another.

The description which follows with reference to the accompanying non-limitative exemplary drawings of an embodiment of the invention, as applied to the nose of a hypersonic vehicle designed for speeds of over Mach 5 and comprising pyrolytic graphite slices in orientated directions, will give a clear understanding of how the invention can be carried into practice.

FIG. 5 is a perspective showing of the stacked carbon slices forming the nose of the hypersonic vehicle, in an embodiment of this invention; and FIG. 6 and FIGS. 7 through 10 and 7a through 10a are axial and cross-sectional views showing the arrangement of the pins for interconnecting the slices.

Figure 1:
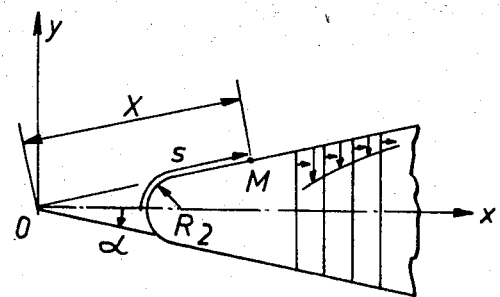
FIG. 1 is a schematic axial showing of the profile of the heat fluxes through a nose for hypersonic vehicles in accordance with this invention, during the phase of re-entry into the atmosphere.

Generally speaking, for laminar flow conditions, the convection flux along the conical portion of the re-entry nose, as shown in FIG. 1, is given at any point M whose abscissa is $X$ by Lees' formula:

$$qc = q \cdot A(\alpha) \cdot X/RN/[B(\alpha) + (X/RN)^3]^{1/2}$$

where $qc$ is the convection flux in kW/m², $q$ is the convection flux at the stagnation point, $X$ is the distance along the cone from the apex (in metres) $X = RN \cotan \alpha + s - RN (\pi/2 - \alpha)$, $a$ is the half-angle of the cone apex, $s$ is the curvilinear abscissa (in metres), $RN$ is the radius of the sphere (in metres), and $A,B$ are coefficients which depend on the flow and the geometry.

With the geometrical characteristics established and the flow determined, it can be shown that the heat flux is a decreasing function of the distance $X$ along the cone, beyond a distance $X \geq Xo$, with:

$$X_0 = R_N \sqrt[3]{\frac{3/32}{\sin^2\alpha\left[\left(1-\frac{1}{\gamma_\infty M^2_\infty}\right)\sin^2\alpha + \frac{1}{\gamma_\infty M^2_\infty}\right]}} \cdot \left[\frac{D(\omega)}{\omega}\right] \left(\omega = \frac{\pi}{2}-\alpha\right)^{-\cotan^3\alpha}$$

It can be shown further that the heat flux along a cone under turbulent conditions is related to the flux under laminar conditions and that this flux is likewise a function of $X$.

Figure 2:
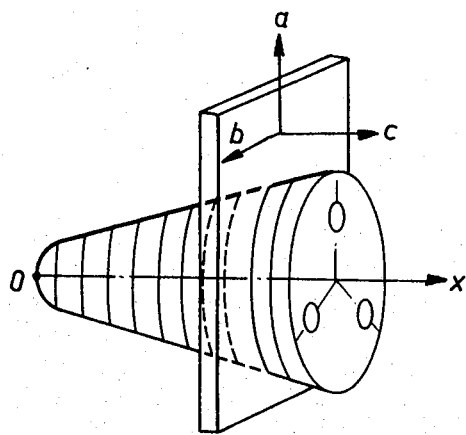
FIG. 2 shows schematically in perspective the orientation of the pyrolytic carbon slices and the angular positions of the connecting pins according to this invention.

Since the heat flux and hence the temperature depend on the distance $X$ from the virtual apex of the cone, in accordance with this invention the nose of the vehicle is made up of pyrolytic carbon slices, as shown in FIG. 2, that are so orientated that the axis "c" parallel to the axis ox represents the direction of least thermal conductivity, whereas the axes "a" and "b" at right angles to the faces represent the direction of greatest thermal conductivity.

Thus the heat flux exhibits a profile of the kind shown in FIG. 1, in which it will be seen that the temperature is due essentially to the entering convection flux and that conduction in the $x$ direction is negligible.

FIG. 5 shows an embodiment of this invention in the case of a hypersonic vehicle nose weighing approximately 1,500 kg and capable of withstanding the loadings engendered by 500 seconds of level flight in the case of a heat flux of 100 kW/m².

A nose of this kind, generally designated by reference numeral 1 in the drawings, consists of a stack of pyrolytic carbon slices designated 3 through 22, and this stack includes a spherical termination 2, while an arrangement of interconnecting pins, to which further reference will be had hereinafter, is used to unite the several nose elements.

Obviously, the pyrolytic carbon slices are orientated in the manner described precedingly, and the overall configuration is such as to satisfy the aerodynamic requirements in operation.

Figures 3, 4:
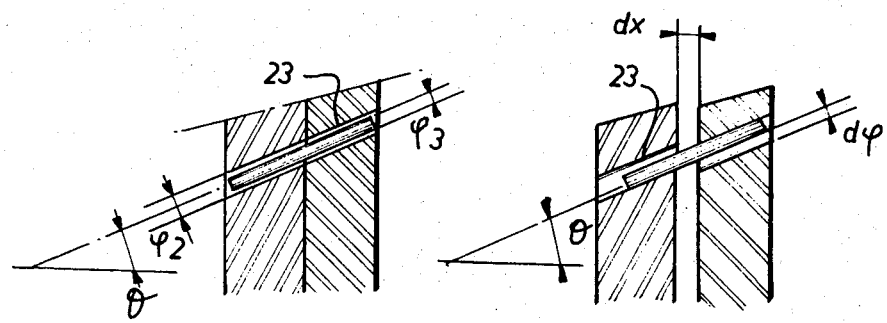
FIG. 3 is a partial sectional view portraying the manner in which pins are used to interconnect two carbon slices when the latter are adjoining.
FIG. 4 shows in partial section the method of using pins for interconnecting two carbon slices when the latter are spaced from each other.

Interconnection, which consists in joining two consecutive slices and which is illustrated in partial section in FIGS. 3 and 4, is accomplished by means of three pins made of a material having a high melting point, such as tungsten, inclined at an angle $\theta$ to the nose axis. This inclination prevents the two slices from separating by an amount in excess of dx defined by:

$$dx = d\ \phi/\sin\theta$$

where $d\phi$ is the clearance of the pins in their holes at the temperature considered.

Further, each pair of slices is united by three pins, as shown in FIGS. 6, 7 through 10, and 7a through 10a.

In order to prevent the pins from overlapping, their positions must be rotated through a certain angle every two slices.

In the embodiment of this invention, the pins $23_1\ a, b, c$, to $23_{21}\ a, b, c$ in FIG. 5 are mutually offset by an angle equal to $2\pi/9$, which results in an arrangement similar to that shown in FIGS. 6, 7 through 10, and 7a through 10a.

The pairs of slices can readily be assembled together by means of the pins, provided that the latter are inserted starting from the spherical portion of the nose and that an adequate interconnecting element is positioned between the last slice and the structure of the vehicle.

Further, possible alternative embodiments leading to improved slice interfaces could consist in:
- glueing the slices together,
- joining the slices with a cement in between,
- or inserting an intermediate felt of thin graphite.

It goes without saying that the specific form of embodiment hereinbefore described has been given by way of example only in order to clearly show the possibilities inherent in the invention, and that changes and substitutions may be made without departing from the scope of the invention.

I claim:

1. A pyrolytic carbon nose for hypersonic vehicles, having a termination point and a generating axis, comprising pyrolytic carbon, stacked, oriented slices characterized in that traversing pins, inclined toward said terminal point with respect to said nose generating axis, interconnect said slices in pairs producing a global linking of all the slices together.

2. A hypersonic vehicle nose as claimed in claim 1, further characterized by the fact that said pins are made of tungsten and are cylindrical in shape.

3. A hypersonic vehicle nose as claimed in claim 1, further characterized by the fact that bores are formed in said slices for receiving said pins with clearance therein.

4. A hypersonic vehicle nose as claimed in claim 1, further characterized by the fact that each pair of said slices is united by three of said pins.

5. A hypersonic vehicle nose as claimed in claim 1, further characterized by the fact that the positioning of said pins is offset by a certain angle every two slices.

6. A hypersonic vehicle nose as claimed in claim 1, in which a felt of thin graphite is inserted between said slices.

* * * * *